(12) United States Patent
Tsai (10) Patent No.: US 11,849,706 B2
(45) Date of Patent: Dec. 26, 2023

(54) FEEDING APPARATUS AND DISCHARGING ADJUSTMENT STRUCTURE THEREOF

(71) Applicant: CHICONY ELECTRONICS CO., LTD., New Taipei (TW)

(72) Inventor: Pei-Sheng Tsai, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 190 days.

(21) Appl. No.: 17/136,328

(22) Filed: Dec. 29, 2020

(65) Prior Publication Data

US 2021/0289745 A1  Sep. 23, 2021

Related U.S. Application Data

(60) Provisional application No. 62/991,685, filed on Mar. 19, 2020.

(30) Foreign Application Priority Data

Jun. 5, 2020 (TW) .................................. 109118987

(51) Int. Cl.
*A01K 5/02* (2006.01)

(52) U.S. Cl.
CPC .......... *A01K 5/0225* (2013.01); *A01K 5/0275* (2013.01); *A01K 5/0291* (2013.01)

(58) Field of Classification Search
CPC .. A01K 5/0225; A01K 5/0275; A01K 5/0291; A01K 5/02; A01K 15/025; A01K 39/0125; F16K 3/00; F16K 3/34

USPC .......................................................... 119/53
See application file for complete search history.

(56) References Cited

U.S. PATENT DOCUMENTS

| | | | | | |
|---|---|---|---|---|---|
| 2,877,927 | A | * | 3/1959 | King, Jr. ............ | B65D 83/0409 221/246 |
| 6,923,142 | B2 | * | 8/2005 | Kleinsasser .......... | A01K 5/0225 119/53 |
| 8,573,156 | B2 | * | 11/2013 | Gates .................. | A01K 39/012 119/53 |
| 2018/0347708 | A1 | * | 12/2018 | Binder ................. | F16K 3/0227 |
| 2019/0059319 | A1 | | 2/2019 | Hsiao et al. | |
| 2019/0099779 | A1 | * | 4/2019 | Farmer ................ | E01C 19/203 |

FOREIGN PATENT DOCUMENTS

| | | |
|---|---|---|
| CN | 202212364 U | 5/2012 |
| CN | 203399595 U | 1/2014 |
| CN | 208402848 U | 1/2019 |
| TW | 201912017 A | 4/2019 |

* cited by examiner

*Primary Examiner* — Joshua J Michener
*Assistant Examiner* — Nicole Paige Maccrate
(74) *Attorney, Agent, or Firm* — Muncy, Geissler, Olds & Lowe, P.C.

(57) ABSTRACT

A feeding apparatus includes a storage chamber, an ejection channel and a discharging adjustment structure. The storage chamber has a discharging hole. The ejection channel communicates with the storage chamber through the discharging hole. The discharging adjustment structure is disposed in the storage chamber and includes a fixing member and a baffle. The fixing member is disposed on a side wall of the storage chamber and is adjacent to the discharging hole. The baffle is movably disposed on the fixing member, and one end of the baffle is adjacent to the discharging hole.

13 Claims, 6 Drawing Sheets

FEEDING APPARATUS AND DISCHARGING ADJUSTMENT STRUCTURE THEREOF

CROSS REFERENCE TO RELATED APPLICATIONS

This application claims priority of Application No. TW 109118987 filed in Taiwan on Jun. 5, 2020 under 35 U.S.C. § 119; and this application claims priority of U.S. Provisional Application No. 62/991,685 filed on Mar. 19, 2020 under 35 U.S.C. § 119(e), the entire contents of all of which are hereby incorporated by reference.

BACKGROUND

1. Technical Field

The present disclosure relates to feeding apparatus and, more particularly, to a discharging adjustment structure of the feeding apparatus.

2. Description of the Related Art

More and more families or individuals keep pets, but a busy life makes it difficult for the pet keepers to feed their pets regularly. In order to solve the problem of the pet keepers being unable to feed their pets when they are outside the home, an automatic feeding apparatus is available on the market. The pet keeper can put the pet food into a storage chamber of the feeding apparatus directly; then this kind of feeding apparatus can provide a meal of pet food at a predetermined time. In addition to the daily two or three meals, the pet keepers often reward pets by giving them pet food or snacks. Therefore, another automatic feeding apparatus capable of flinging pet food toward a pet is commercially available, and this kind of feeding apparatus enhances the interaction between the pet and pet keeper.

This type of automatic feeding apparatus (i.e., feeding a pet by flinging food) has a complicated ejection mechanism, and it only flings a small amount of pet food to prevent the pet food from becoming stuck in the automatic feeding apparatus and preventing normal operation. This type of automatic feeding apparatus mainly comprises a storage chamber, a push rod, an ejection channel and an ejection mechanism. The push rod is disposed in the storage chamber. The storage chamber has a discharging hole, and the storage chamber communicates with the ejection channel through the discharging hole. First, the pet keeper can put a certain amount of pet food into the storage chamber. When an ejection function is activated, a small amount of pet food can be pushed to the discharging hole by the push rod and enters the ejection channel through the discharging hole. Then the small amount of pet food in the ejection channel can be ejected to the outside of the automatic feeding apparatus by the ejection mechanism, thereby achieving the effect of feeding the pet by flinging food.

However, the size of the discharging hole is constant, so the amount of the pet food entering the ejection channel cannot be adjusted. Therefore, this type of automatic feeding apparatus cannot achieve the function of reducing the amount of pet food in an ejection. Furthermore, the sizes of the grains or pellets of pet food of different brands or types may be different, so pet food of different brands or types may easily become lodged in the automatic feeding apparatus. The size of the discharging hole of the conventional automatic feeding apparatus cannot be adjusted according to the grain size of the pet food. Therefore, the prior art still has room for improvement.

SUMMARY

In view of the aforesaid drawbacks of the prior art, it is an objective of the present disclosure to provide a feeding apparatus which comprises a discharging adjustment structure to overcoming drawbacks of the prior art, namely, that the discharging hole of the conventional feeding apparatus cannot be adjusted.

In order to achieve the above objectives, the present disclosure provides a feeding apparatus, which comprises a storage chamber, an ejection channel and a discharging adjustment structure. The storage chamber has a discharging hole. The ejection channel communicates with the storage chamber through the discharging hole. The discharging adjustment structure is disposed in the storage chamber and comprises a fixing member and a baffle. The fixing member is disposed on a side wall of the storage chamber and is adjacent to the discharging hole. The baffle is movably disposed on the fixing member, and an end of the baffle is adjacent to the discharging hole.

In order to achieve the above objectives, the present disclosure further provides a discharging adjustment structure, which is applied to a feeding apparatus. The feeding apparatus comprises a storage chamber and an ejection channel, and the storage chamber has a discharging hole that communicates with the ejection channel. The discharging adjustment structure comprises a fixing member and a baffle. The fixing member is disposed on a side wall of the storage chamber and is adjacent to the discharging hole. The baffle is movably disposed on the fixing member, and an end of the baffle is adjacent to the discharging hole.

In an embodiment of the present disclosure, when the baffle moves relative to the fixing member, the baffle adjusts the size of the discharging hole.

In an embodiment of the present disclosure, the fixing member has a convex portion, and the baffle has a groove. The baffle is sleeved on the convex portion of the fixing member with the groove.

In an embodiment of the present disclosure, the discharging adjustment structure further comprises an anti-slip member, which is disposed between the fixing member and the baffle.

In an embodiment of the present disclosure, the anti-slip member is disposed on an outer surface of the fixing member, and the anti-slip member contacts an inner surface of the baffle.

In an embodiment of the present disclosure, the fixing member has at least one first positioning portion, and the baffle has at least one second positioning portion. The first positioning portion and the second positioning portion are concave and convex structures and engage with each other.

In an embodiment of the present disclosure, the fixing member has at least one rib, and the baffle has at least one convex portion. The rib and the convex portion press against each other.

In an embodiment of the present disclosure, the baffle is divided into a first area and a second area, the first area being away from the discharging hole and the second area being adjacent to the discharging hole.

In an embodiment of the present disclosure, the hardness of the first area is greater than the hardness of the second area.

In an embodiment of the present disclosure, the baffle comprises at least one stress weakening structure, which is disposed on the second area.

In an embodiment of the present disclosure, the baffle comprises a curved opening, which is located at the end of the baffle adjacent to the discharging hole.

As above, according to the feeding apparatus and its discharging adjustment structure of the present disclosure, the discharging adjustment structure includes a fixing member and a baffle. The fixing member is adjacent to the discharging hole, and the baffle is movably disposed on the fixing member. Thereby, the baffle is able to move relative to the fixing member and control the area of the discharging hole that the material passes through. Therefore, the feeding apparatus and its discharging adjustment structure of the present disclosure can be applied to material in pellet or other granular forms (i.e., pet food) of different sizes and meet the requirement of reducing the amount of pet food in an ejection.

BRIEF DESCRIPTION OF THE DRAWINGS

In the drawings, wherein similar reference numerals denote similar elements throughout the several views.

DETAILED DESCRIPTION OF THE EMBODIMENTS

In order to make the structure and characteristics as well as the effectiveness of the present disclosure to be further understood and recognized, detailed description of the present disclosure is provided as follows along with embodiments and accompanying figures.

Figure 1:
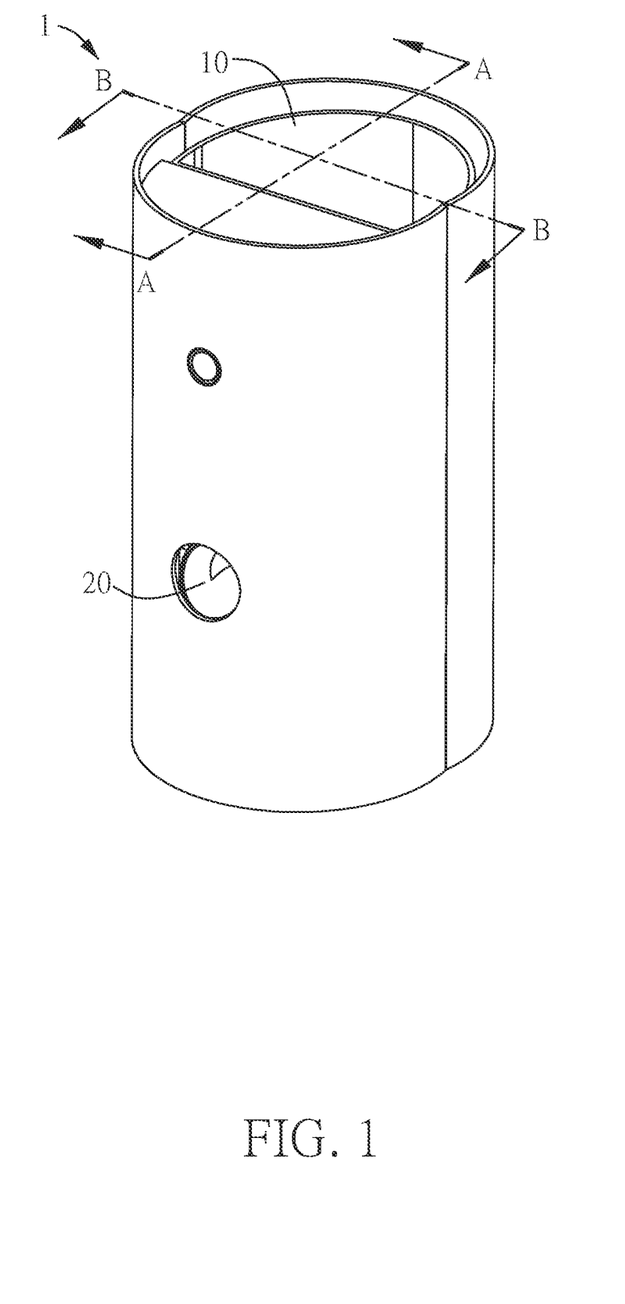
FIG. 1 illustrates a perspective view of a feeding apparatus according to a first embodiment of the present disclosure.
Figure 2:
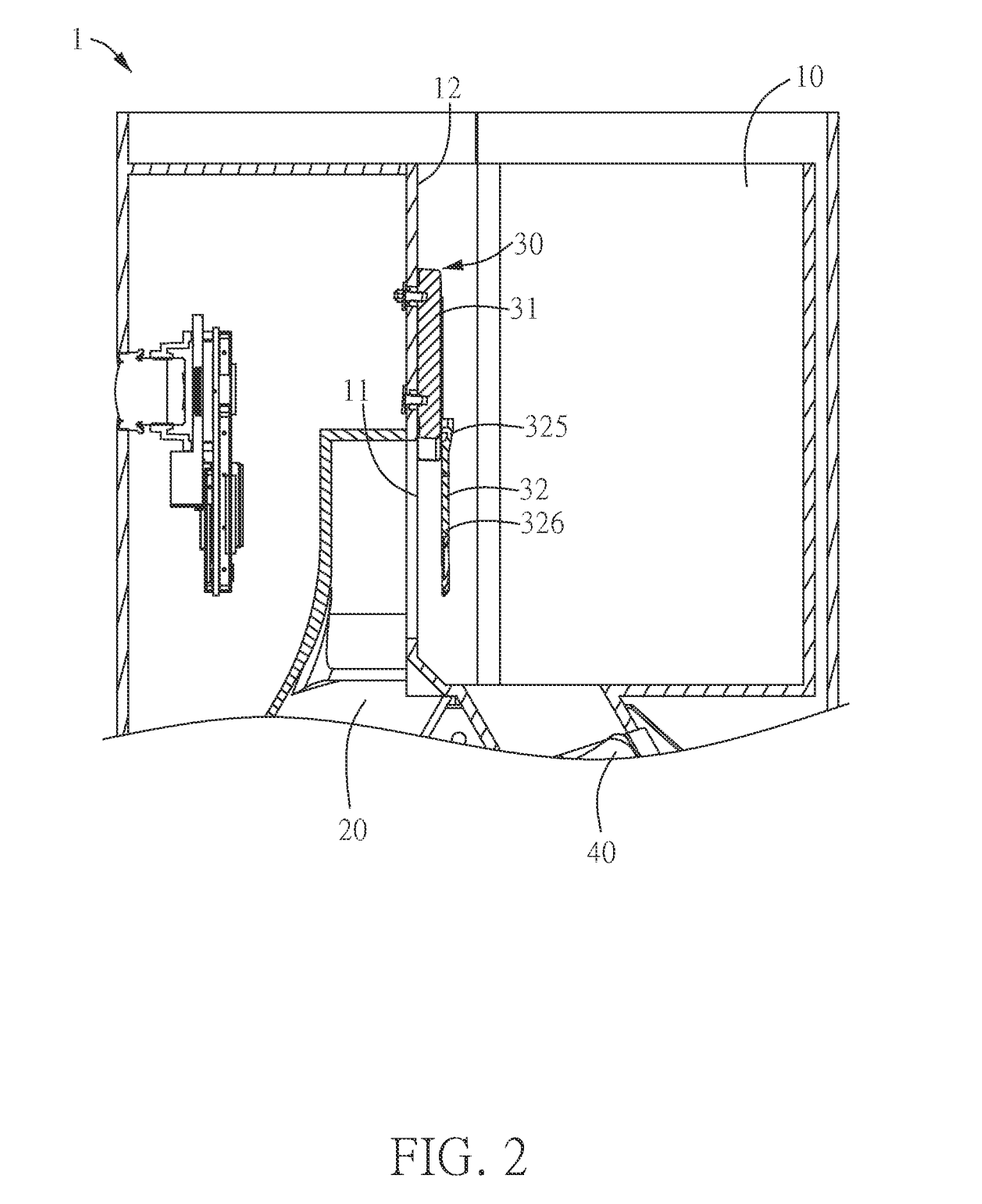
FIG. 2 illustrates a cutaway view along line A-A of the feeding apparatus shown in FIG. 1.
Figure 3:
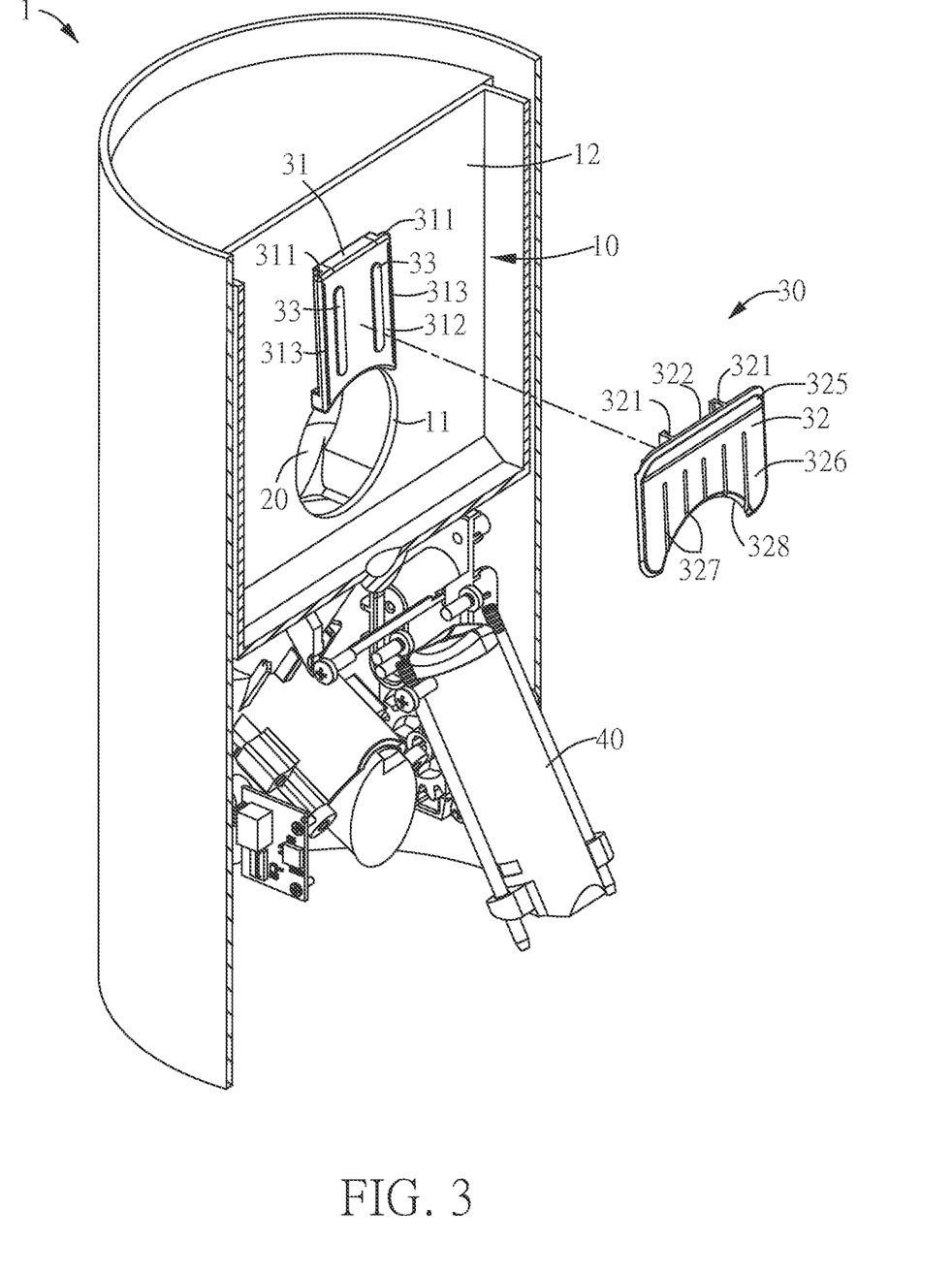
FIG. 3 illustrates a cutaway view along line B-B of the feeding apparatus shown in FIG. 1.

FIG. 1 illustrates a perspective view of a feeding apparatus according to a first embodiment of the present disclosure; FIG. 2 illustrates a cutaway view along line A-A of the feeding apparatus shown in FIG. 1; and FIG. 3 illustrates a cutaway view along line B-B of the feeding apparatus shown in FIG. 1. Referring to FIG. 1, FIG. 2 and FIG. 3, in this embodiment, a feeding apparatus 1 is applied to an automatic feeding apparatus for flinging pet food toward a pet to be fed to achieve the effect of feeding and interacting with a pet at the same time. In this embodiment, the pet food or a pet snack is hereinafter referred to as the material. In another embodiment, the material is a toy that the pet plays with. A user (pet keeper) can put the feeding apparatus 1 in a living room, a pet playroom or the like. The feeding apparatus 1 may be set to discharge pet food regularly or be controlled remotely.

The feeding apparatus 1 comprises a storage chamber 10, an ejection channel 20, a discharging adjustment structure 30 and a push rod 40. The storage chamber 10 is used for accommodating the material (such as pet food), and the push rod 40 is disposed on the bottom side of the storage chamber 10. The storage chamber 10 has a discharging hole 11, which is located between the storage chamber 10 and the ejection channel 20. In other words, the ejection channel 20 communicates with the storage chamber 10 through the discharging hole 11. When the user (pet keeper) activates an ejection function, a motor (not shown in FIG.) moves the push rod 40 toward the storage chamber 10. Further, when the push rod 40 moves toward the discharging hole 11, a portion of material in the storage chamber 10 may be pushed to the discharging hole 11, and the portion of material may drop into the ejection channel 20 through the discharging hole 11. It should be noted that an ejection mechanism (not shown in FIG.) is disposed on the bottom side of the ejection channel 20, and the ejection mechanism is used to eject the material in the ejection channel 20 to the outside of the feeding apparatus 1 to achieve the effect of feeding pets by flinging food.

Referring to FIG. 2 and FIG. 3, the discharging adjustment structure 30 is disposed in the storage chamber 10, and the discharging adjustment structure 30 comprises a fixing member 31 and a baffle 32. The fixing member 31 is disposed on a side wall 12 of the storage chamber 10 and adjacent to the discharging hole 11. In this embodiment, the fixing member 31 is disposed on the inner side wall storage chamber 10. In another embodiment, the fixing member 31 may be disposed on the outer side wall of the storage chamber 10 and only needs to be adjacent to the discharging hole 11; however, the present disclosure is not limited thereto. Further, the baffle 32 is movably disposed on the fixing member 31 such that an end of the baffle 32 is adjacent to the discharging hole 11. Therefore, the baffle 32 is able to adjust the area of the discharging hole 11 that the material passes through (as shown in FIG. 5A and FIG. 5B) by moving relative to the discharging hole 11.

Figure 4:
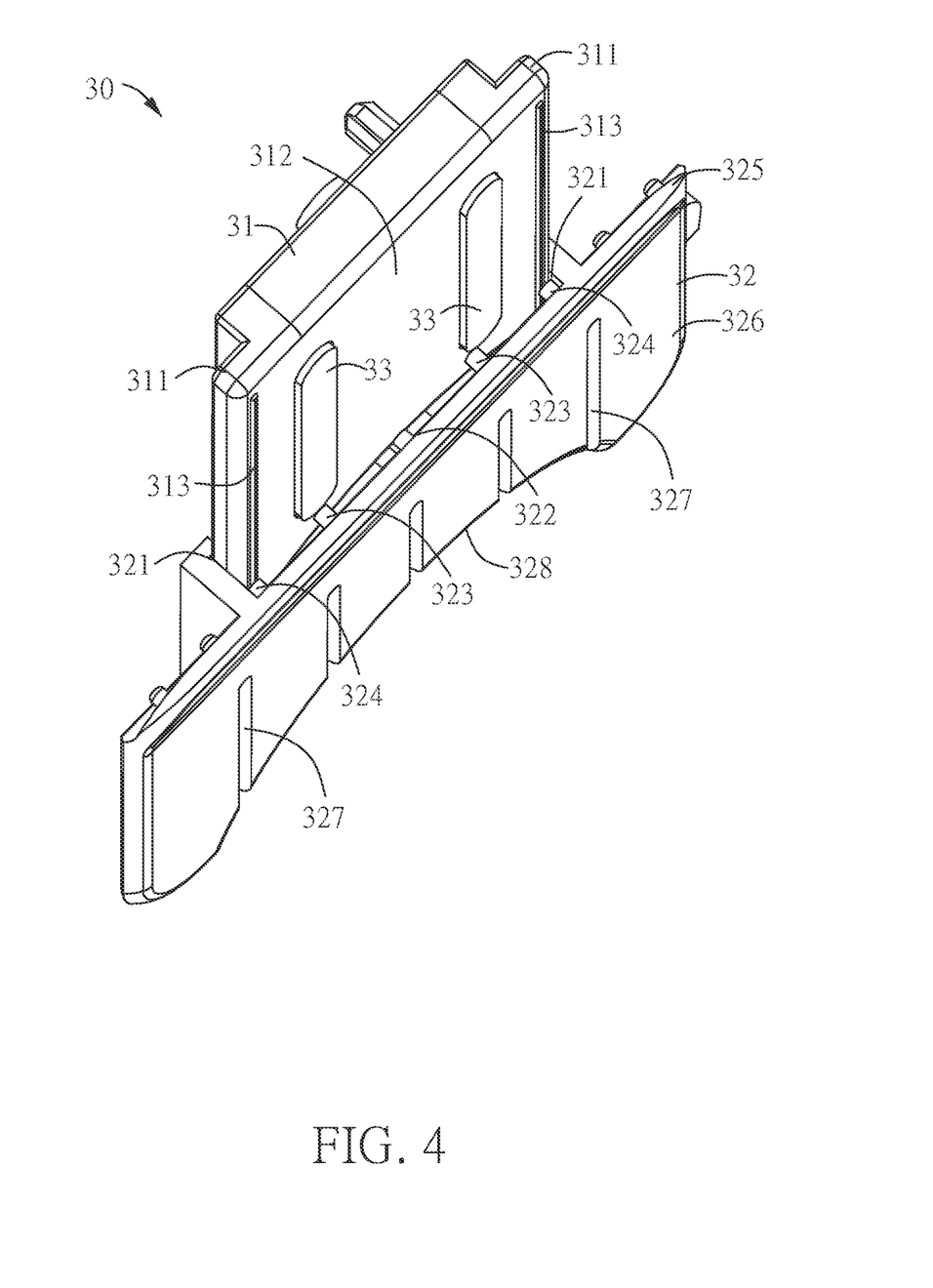
FIG. 4 illustrates an enlarged view of a discharging adjustment structure as shown in FIG. 3 after assembly.

FIG. 4 illustrates an enlarged view of a discharging adjustment structure as shown in FIG. 3 after assembly. Referring to FIG. 3 and FIG. 4, the fixing member 31 and the baffle 32 are connected by a concave-convex structure such that the baffle 32 is able to be disposed on the fixing member 31 and move relative to the fixing member 31. In this embodiment, the two opposite sides of the fixing member 31 each have a convex portion 311, respectively. Correspondingly, the two opposite sides of the baffle 32 each have a groove 321, respectively. The baffle 32 sleeves on the convex portion 311 of the fixing member 31 by the groove 321. In other words, the groove 321 sleeves on the convex portion 311 such that the baffle 32 can move relative to the fixing member 31. Specifically, the convex portions 311 are located on the right and left sides of the fixing member 31 and the grooves 321 are located on the right and left sides of the baffle 32 such that the baffle 32 is able to move upward or downward relative to the fixing member 31.

Figure 5A:
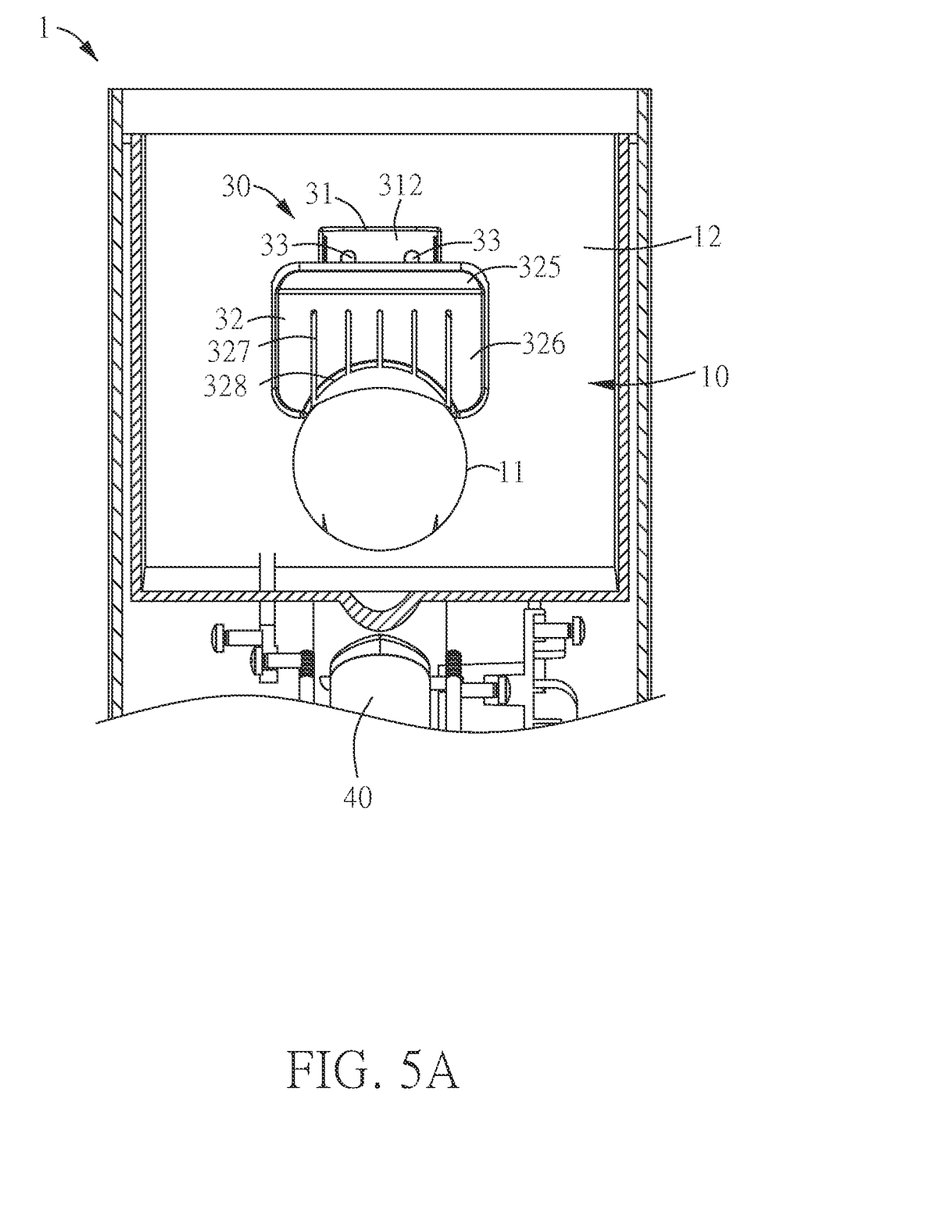
FIG. 5A and FIG. 5B illustrate a schematic view of the movement of the discharging adjustment structure shown in FIG. 3.
Figure 5B:
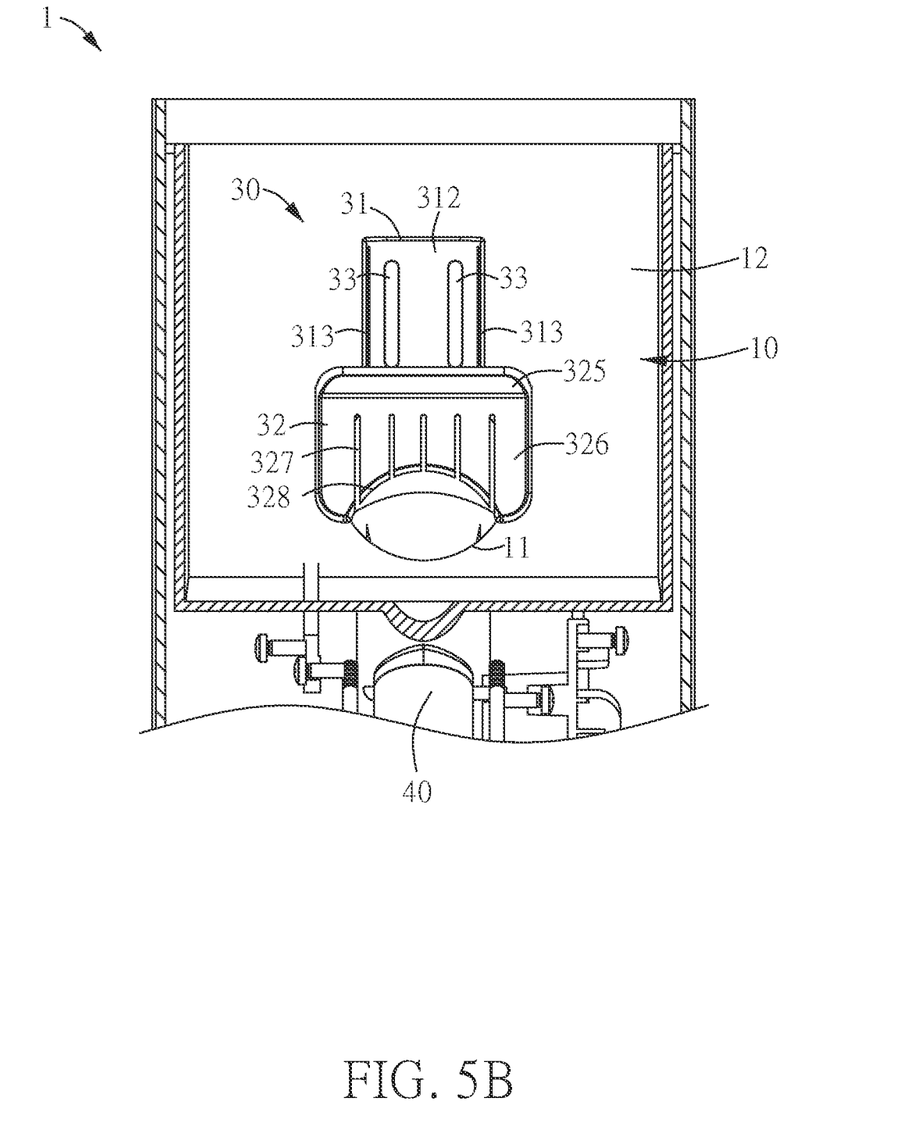

FIG. 5A and FIG. 5B illustrate a schematic view of the movement of the discharging adjustment structure shown in FIG. 3. Referring to FIG. 5A and FIG. 5B, when the user (pet keeper) puts the material (pet food) into the storage chamber 10, the user can also adjust the position of the baffle 32 to adjust the area of the discharging hole 11 that the material passes through. For example, if the average grain size of a granular material (pet food) is smaller or the amount of food needs to be reduced, the user can push down the baffle 32 (as shown in FIG. 5B) such that one end of the baffle 32 covers a portion of the discharging hole 11 to reduce the area of the discharging hole 11 that the material passes through. In contrast, if the average grain size of the granular material (pet food) is larger, the user can pull up the baffle 32 (as shown in FIG. 5A) to increase the area of the discharging hole 11 that the material passes through.

Referring to FIG. 3 and FIG. 4, preferably, the discharging adjustment structure 30 further comprises an anti-slip member 33, and the anti-slip member 33 is disposed between the fixing member 31 and the baffle 32. The anti-slip member 33 may be, but is not limited to, a rubber material, which can achieve the effect of fixing the relative position of the baffle 32 and the fixing member 31. Further, the rubber material can also function as a damper with great effect such that the baffle 32 can move to any position smoothly without a step difference and be fixed in that position.

Specifically, the anti-slip member 33 is disposed on an outer surface 312 of the fixing member 31, and the anti-slip member 33 contacts an inner surface 322 of the baffle 32. It should be noted that, in this embodiment, the side surface of the fixing member 31 that is not connected to the storage chamber 10 is called the outer surface 312, and the side surface of the baffle 32 that is adjacent to the fixing member 31 is called the inner surface 322. Referring to FIG. 4, preferably, the inner surface 322 of the baffle 32 has a convex portion 323 that presses against the anti-slip member 33. It should be noted that the anti-slip member 33 directly contacts the inner surface 322 of the baffle 32 to achieve the same positioning effect.

In another embodiment, the anti-slip member 33 may also be disposed on the inner surface 322 of the baffle 32 and contacts the outer surface 312 of the fixing member 31, and it can also achieve the positioning effect aforementioned. In another embodiment, the fixing member 31 can also comprise at least one first positioning portion, and the baffle 32 comprises at least one second positioning portion, correspondingly. The first positioning portion and the second positioning portion are able to engage with each other. For example, the first positioning portion and the second positioning portion are concave-convex structures. Specifically, the outer surface 312 of fixing member 31 may have a plurality of grooves (as the first positioning portions), and the inner surface 322 of the baffle 32 has a contact spring (as the second positioning portion). The contact spring (second positioning portion) moves in a compressed state. When the contact spring (second positioning portion) moves to the groove (first positioning portion), the contact spring (second positioning portion) pops up and into the groove (first positioning portion) to achieve the effect of multi-stage positioning. It should be noted that the anti-slip member 33, the first positioning portion and the second positioning portion can be configured according to variable design requirements, and that both can achieve the positioning effect.

Preferably, the fixing member 31 has at least one rib 313, the baffle 32 correspondingly has at least one convex portion 324, and the rib 313 and the convex portion 324 press against each other. In this embodiment, the rib 313 is located on the outer surface 312 of the fixing member 31, and the convex portion 324 is located on the inner surface 322 of the baffle 32. One end of the convex portion 324 presses against the rib 313 to reduce the gap between the fixing member 31 and the baffle 32 such that the baffle 32 and the fixing member 31 are prevented from shaking when the baffle 32 is moving.

The baffle 32 may be divided to a first area 325 and a second area 326. The first area 325 is away from the discharging hole 11, and the second area 326 is adjacent to the discharging hole 11. Taking FIG. 5A and FIG. 5B as an example, the first area 325 is located on an upper area of the baffle 32, which is the area constantly connected to the fixing member 31. In other words, when the baffle 32 is pressed down, the first area 325 still has a structure (i.e. the groove 321) connecting the fixing member 31. The area of the baffle 32 outside the first area 325 is called the second area 326, so the second area 326 is adjacent to the discharging hole 11.

Preferably, the hardness of the first area 325 is greater than the hardness of the second area 326. Specifically, the baffle 32 may be formed by double injection molding (also known as two-component injection molding). The first area 325 is a hard plastic member, such as polycarbonate (PC), and the second area 326 is a soft member, such as thermoplastic polyurethane (TPU). With the first area 325 being a hard material, the baffle 32 and the fixing member 31 may be firmly connected, and the baffle 32 may stably move relative to the fixing member 31. The second area 326 is the soft member to prevent the material (pet food) from being damaged by the baffle 32.

Preferably, the baffle 32 further comprises at least one stress weakening structure 327, which may be preferably disposed on the second area 326. The stress weakening structure 327 may be, but is not limited to, a recess or a through groove. The stress weakening structure 327 is able to weaken the structure in the second area 326 to achieve a better effect of preventing the material from being damaged.

Preferably, the baffle 32 further comprises a curved opening 328, which is located at the end of the baffle 32 adjacent to the discharging hole 11. In other words, a bottom edge of the baffle 32 is the curved opening 328. Generally, the discharging hole 11 is a circular opening, and the shape of the curved opening 328 corresponds to the shape of the discharging hole 11 such that the push rod 40 can more easily push the material into the ejection channel 20.

The present disclosure further comprises a discharging adjustment structure, which is applied in the feeding apparatus. The feeding apparatus comprises a storage chamber and an ejection channel. The storage chamber has a discharging hole that communicates with the ejection channel. The discharging adjustment structure comprises a fixing member and a baffle. The fixing member is disposed on a side wall of the storage chamber and is adjacent to the discharging hole. The baffle is moveably disposed on the fixing member, and one end of the baffle is adjacent to the discharging hole. The other details of the discharging adjustment structure are the same as those described in the aforementioned embodiment and thus will not be described in detail herein.

As above, according to the feeding apparatus and the discharging adjustment structure of the present disclosure, the discharging adjustment structure includes a fixing member and a baffle. The fixing member is adjacent to the discharging hole, and the baffle is movably disposed on the fixing member. Thereby, the baffle is able to move relative to the fixing member and control the area of the discharging hole that the material passes through. Therefore, the feeding apparatus and its discharging adjustment structure of the present disclosure can be applied to a material (i.e., pet food) having grains of different sizes and meet the requirement of reducing the amount of pet food in an ejection.

It should be noted that the described embodiments are only for illustrative and exemplary purposes and that various changes and modifications may be made to the described embodiments without departing from the scope of the application as disposed by the appended claims.

What is claimed is:
1. A feeding apparatus, comprising:
   a storage chamber having a discharging hole;
   an ejection channel communicating with the storage chamber through the discharging hole; and a discharging adjustment structure disposed in the storage chamber, the discharging adjustment structure comprising:

a fixing member disposed on a side wall of the storage chamber and adjacent to the discharging hole;

a baffle movably disposed on the fixing member, one end of the baffle being adjacent to the discharging hole, and the baffle comprising at least one stress weakening structure, wherein the stress weakening structure is a recess or a through groove, wherein the baffle is divided into a first area and a second area, the first area being away from the discharging hole and the second area being adjacent to the discharging hole, the hardness of the first area is greater than the hardness of the second area; and an anti-slip member disposed between the fixing member and the baffle for fixing the relative position of the baffle and the fixing member.

2. The feeding apparatus of claim 1, wherein, when the baffle moves relative to the fixing member, the baffle adjusts the size of the discharging hole.

3. The feeding apparatus of claim 1, wherein the fixing member has a convex portion, the baffle has a groove, and the baffle is sleeved on the convex portion of the fixing member with the groove.

4. The feeding apparatus of claim 1, wherein the anti-slip member is disposed on an outer surface of the fixing member, and the anti-slip member contacts an inner surface of the baffle.

5. The feeding apparatus of claim 1, wherein the fixing member has at least one rib, the baffle has at least a convex portion, and the rib and the convex portion press against each other.

6. The feeding apparatus of claim 1, wherein the baffle comprises a curved opening, the curved opening being located at the end of the baffle adjacent to the discharging hole.

7. A discharging adjustment structure, applied to a feeding apparatus comprising a storage chamber and an ejection channel, the storage chamber having a discharging hole that communicates with the ejection channel and the discharging adjustment structure comprising:

a fixing member disposed on a side wall of the storage chamber and adjacent to the discharging hole;

a baffle movably disposed on the fixing member, one end of the baffle being adjacent to the discharging hole, and the baffle comprising at least one stress weakening structure, wherein the stress weakening structure is a recess or a through groove, wherein the baffle is divided into a first area and a second area, the first area being away from the discharging hole and the second area being adjacent to the discharging hole, the hardness of the first area is greater than the hardness of the second area; and an anti-slip member disposed between the fixing member and the baffle for fixing the relative position of the baffle and the fixing member.

8. The discharging adjustment structure of claim 7, wherein, when the baffle moves relative to the fixing member, the baffle adjusts the size of the discharging hole.

9. The discharging adjustment structure of claim 7, wherein the fixing member has a convex portion, the baffle has a groove, and the baffle is sleeved on the convex portion of the fixing member with the groove.

10. The discharging adjustment structure of claim 7, wherein the anti-slip member is disposed on an outer surface of the fixing member, and the anti-slip member contacts an inner surface of the baffle.

11. The discharging adjustment structure of claim 7, wherein the fixing member has at least one rib, the baffle has at least a convex portion, and the rib and the convex portion press against each other.

12. The discharging adjustment structure of claim 7, wherein the baffle comprises a curved opening, the curved opening being located at the end of the baffle adjacent to the discharging hole.

13. A feeding apparatus, applied to an automatic feeding apparatus for flinging a material, the feeding apparatus comprising:

a storage chamber accommodating the material and having a discharging hole;

an ejection channel communicating with the storage chamber through the discharging hole;

a discharging adjustment structure disposed in the storage chamber, the discharging adjustment structure comprising:

a fixing member disposed on a side wall of the storage chamber and adjacent to the discharging hole;

a baffle movably disposed on the fixing member, one end of the baffle being adjacent to the discharging hole, wherein the baffle is divided into a first area and a second area, the first area being away from the discharging hole and the second area being adjacent to the discharging hole, the hardness of the first area is greater than the hardness of the second area; and an anti-slip member disposed between the fixing member and the baffle for fixing the relative position of the baffle and the fixing member; and a push rod disposed on a bottom side of the storage chamber, and the push rod being moved toward the discharging hole to push the material to the ejection channel through the discharging hole.

* * * * *